251/203

United States Patent [19]
Lewis

[11] 4,362,932
[45] Dec. 7, 1982

[54] WIDE BAND DATA PROCESSING TECHNIQUE

[75] Inventor: Bernard L. Lewis, Oxon Hill, Md.

[73] Assignee: The United States of America as represented by the Secretary of the Navy, Washington, D.C.

[21] Appl. No.: 227,568

[22] Filed: Jan. 22, 1981

[51] Int. Cl.³ .............................................. G01J 1/20
[52] U.S. Cl. .............................. 250/203 CT; 250/578
[58] Field of Search .................. 250/203 CT, 578, 216, 250/209; 307/221 D; 333/138–140, 165; 358/125, 126

[56] References Cited

U.S. PATENT DOCUMENTS 3,505,666   4/1970   Thorpe ........................... 250/203 CT
4,327,377   4/1982   Takken ................................ 250/578

*Primary Examiner*—David C. Nelms
*Attorney, Agent, or Firm*—Robert F. Beers; William T. Ellis

[57] ABSTRACT

A wide band clock controlled delay line for reading-in short pulses at high speed and reading them out at low speed comprises in one embodiment an array of charge coupled photon detectors (CCPD's) and a CRT circuit for generating and scanning an electron beam across a short persistence phosphor face to thereby excite the phosphor to emit radiation with an intensity proportional to the electron current in the scanning electron beam. The scanning rate for the beam is sufficient to operate on short pulses from a wide band system. An input signal driver applies an input signal to the CRT circuit to control the intensity of the electron beam, and a lens collects and focuses the light emissions from these phosphors on to the array of CCPD's. A clock pulse generating circuit generates clock pulses at a much slower rate than the scanning electron beam steps from one CCPD to the next for stepping out the charge stored in the array into an adding circuit.

7 Claims, 3 Drawing Figures

WIDE BAND DATA PROCESSING TECHNIQUE

BACKGROUND OF THE INVENTION

The present invention relates generally to radar processing, and more particularly to the recording of echoes from high resolution radar in real time.

A radar system transmitting a radar signal will receive echo returns at different time intervals from a plurality of targets with the time intervals depending on the relative distance of each target from the radar transmission source. That is, a close target return will reach the source relatively sooner than a far target return. It is apparent that the returns from a plurality of targets all resulting from one radar transmission are time sequential and, by identifying each target with a time range, one target return may be discriminated from all other target returns.

In order to perform the association of each target with a particular time slot, the time receipt of the target range of interest may be divided into time bins/range-cells. Then each time-bin/range-cell may be separately interrogated to determine the characteristic of any targets that may be present.

It is a common practice in the prior art to utilize a clock controlled delay line such as, for example, a clock-controlled shift register, as a range buffer so that the storage bits of the shift register define range bins. Radar return signals arriving during a particular pulse repetition interval (PRI) are sampled and clocked into the shift register in time sequential order until the first pulse return has reached the end of the shift register. At that point, the shift register clock is stopped and the data stored in the shift register is transferred out in parallel. Near targets appear in the high numbered range bins while far away targets appear in the low numbered range bins. The parallel outputs from the shift register range bins are then processed to extract the desired information.

"Bucket Brigades" and charge coupled devices (CCD's) have been available for some time for use as clock controlled delay lines. These devices operate relatively effectively on narrow band echos from radars which utilize long transmission pulses. However, the switching time for these devices is inherently limited by the charging time constant $\tau = R_e C$, where $R_e$ is the internal resistance of the device and C is the capacitance of the individual FET's. In order to increase the switching speed of these devices, $R_e C$ must be made small. However, the ON and OFF resistance of the FET's is substantially set by the choice of FET material. Likewise, the capacitance value of the FET's is limited by the material chosen and by the size of the control electrodes used thereon. This limitation on the charge stepping time in the individual FET's accordingly limits the clock rate which may be utilized on the delay line.

In high range resolution radars, a wide bandwidth/short pulse is utilized to significantly reduced the size of the time bin/range cell according to the equation:

$$\text{range cell} = \frac{(\text{pulse length})(C)}{2}$$

where C is the speed of light. These wide bandwidth/short pulses utilized in the high range resolution radars require significantly higher clock rates than may be utilized with "Bucket Brigades" and charge coupled devices. If the designer was to ignore the charging and discharging time limitations on these devices, and increase the clock frequency beyond that which the FET material can handle, then the FET would not charge properly during a single range cell or charging period but would instead leave charge in the FET capacitor which would be seen in the next range cell. Accordingly, this charge spread would result in the averaging of the signal over a number of range bins, resulting in a significant transfer loss, and a concommittant resolution loss. Thus, these low clock rates available for use with "Bucket Brigades" and charge coupled devices, in essence inherently limit these devices to narrow bandwidth systems because the clock rates set the range gate sizes.

OBJECTS OF THE INVENTION

An object of the present invention is to permit echoes from high resolution radars to be recorded in real time.

A further object of the present invention is to permit the real time recording of high resolution radar echoes while still allowing the use of a conventional bandwidth processor.

It is yet a further object of the present invention to provide a high clock rate delay line for use with high range resolution radars.

Other objects, advantages, and novel features of the present invention will become apparent from the detailed description of the invention, which follows the summary.

SUMMARY OF THE INVENTION

Briefly, the present invention comprises a wide band clock-controlled delay line having a high speed read-in and a low speed read-out characteristic comprising:

an array of charge coupled devices;

an energy scanning circuit for generating and scanning the array of charge coupled devices with a beam of energy capable of modulating the charge in a charge coupled device in the array in accordance with the energy intensity of the beam during its dwell time on the charge coupled device, the scanning rate of the beam being sufficient to operate on short pulses from a wide band system;

an input driver circuit for applying an input signal to the energy scanning circuit to control the intensity of the energy beam in accordance therewith;

a signal processing circuit, and a clock pulse generating circuit for generating clock pulses for stepping out the charges stored in the array of charge coupled devices into the signal processing circuit.

DETAILED DESCRIPTION OF THE PREFERRED EMBODIMENTS

The present invention employs a scanning energy beam to read data into one or more linear arrays of charge coupled devices (CCD). The data input signal is utilized to modulate the energy beam current as the beam is scanned across the various CCD arrays. The utilization of a scanning energy beam permits high speed or real time read-in of the data. Such high speed read-in of data permits the use of this system with high resolution radars utilizing short transmission pulses.

Figure 1:
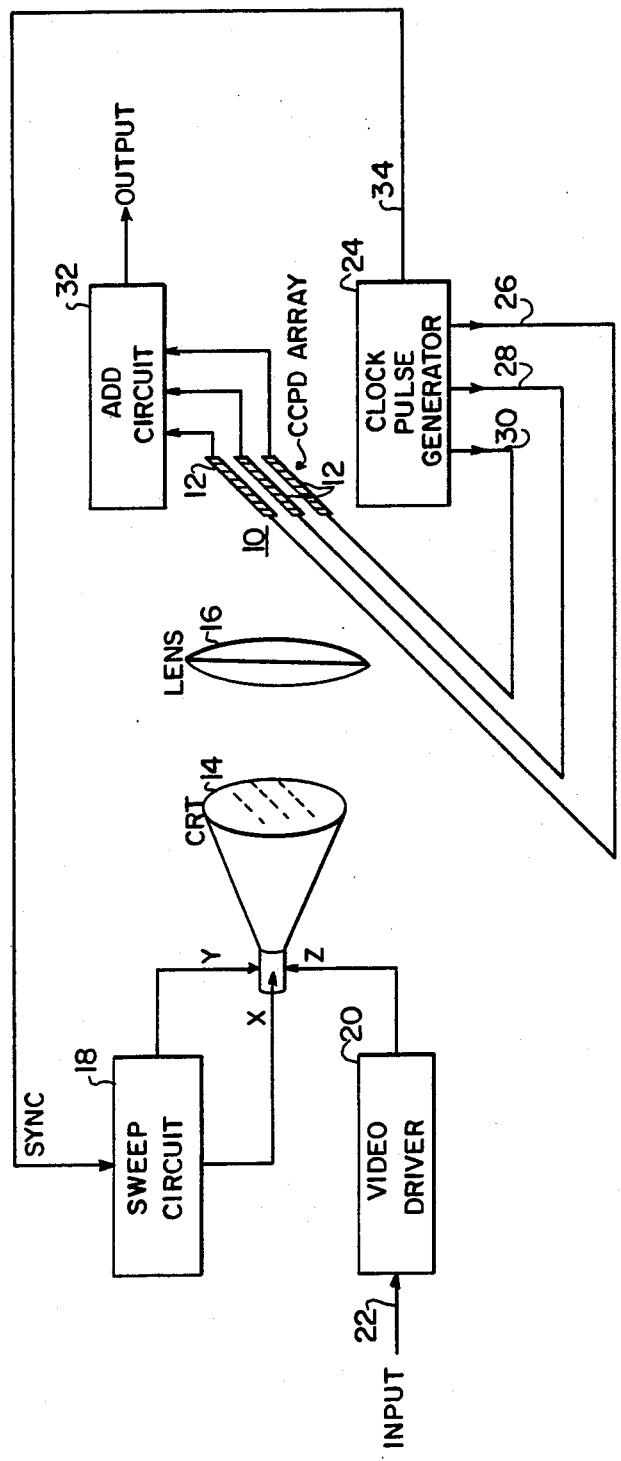
FIG. 1 is a detailed block diagram of one embodiment of the present invention.

FIG. 1 discloses one embodiment of the present invention. Referring more particularly to this figure, an array 10 of charge coupled devices is shown. The array 10 may be composed of one or more linear arrays 12 of charged coupled devices. An energy beam generating and scanning device composed of the elements 14, 16 and 18 provides a scanning beam for scanning across the individual charge coupled devices in the array and modulating the charge in those devices in accordance with the energy intensity of the beam during the dwell time of the beam on the charge coupled device. In this particular embodiment, there is shown a cathode ray tube 14 with a short persistance phosphor on its face that emits light with an intensity proportional to the electron beam current generated in the cathode ray tube. A short persistance phosphor is defined as a phosphor which decays to 90% of its value in approximately 10 ms. The light emitted by the phosphor on the face of the CRT is collected by a lens 16 and focused on the linear arrays 12 of charge coupled devices.

In this particular embodiment, where the energy beam impinging on the charge coupled devices consists of a photon beam, the charge coupled devices may be charged coupled photon detectors. By way of example, the charge coupled photon devices (CCPD's) manufactured by Reticon of Sunnyvale, Calif., may be utilized to implement the linear arrays 12 of FIG. 1.

Each element of the CCPD arrays 12 is thus given a charge input proportional to the light emitted by the particular phosphor section excited by the electron beam at that particular moment. The intensity of this phosphor excitation is, in turn, proportional to the electron beam current striking on that point on the phosphor face of the CRT 14.

The electron beam generated by the CRT 14 may be caused to sweep across the CRT phosphor face by means of a sweep circuit 18. As is well known in the art, such sweep circuits provide voltage ramps to the XY inputs of the CRT in order to cause the electron beam generated therein to sweep over an area. Input signal 22 from a radar system may be applied via video driver 20 to the Z input of the CRT 14 in order to control the electron beam current generated therein. Typically, this radar signal will consist of an echo return which has been received at the radar antenna, heterodyned to IF, IF amplified, and then applied to a video detector. The signal from the video detector is then applied to the video driver 20.

Figure 3:
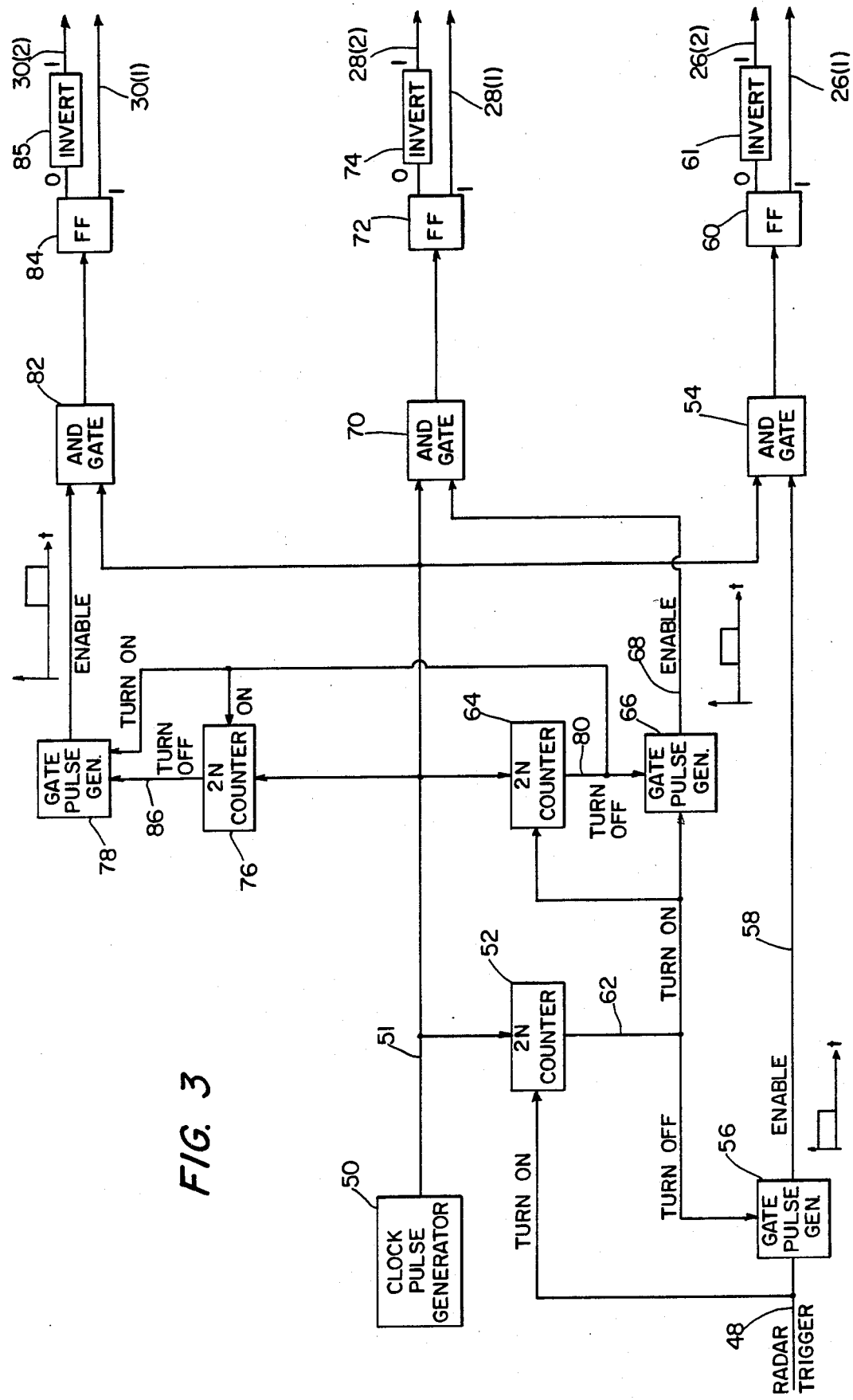
FIG. 3 is a detailed block diagram of one circuit which may be utilized for the clock pulse generator block of FIG. 1 and FIG. 2.

When all of the detector elements in the arrays 12 have been swept by the beam, the beam is blanked and the charge stored in those elements is stepped out by clock pulses in the conventional manner at a desired rate (typically 1 MHz). In FIG. 1, a clock pulse generator 24 is shown for generating the necessary clock pulses to step the charges out of the linear arrays 12. These clock pulses are applied via the lines 26, 28, and 30 to their respective linear arrays 12. The individual charges stored in the linear arrays 12 are stepped via these clock pulses into an adder circuit 32 wherein they may be combined in serial form for further processing. The clock pulse generator 24 also generates a sync pulse 34 for application to sweep circuit 18. The sync pulse represents the beginning of the radar range sweep and is utilized to synchronize the sweep circuit and the clock pulse generator such that the echos from the same targets are stored in the same charge coupled devices so that they appear in the same range cells over a number of radar sweeps. FIG. 3, which discloses the circuitry of the clock pulse generator 24 in more detail, will be discussed later.

Figure 2:
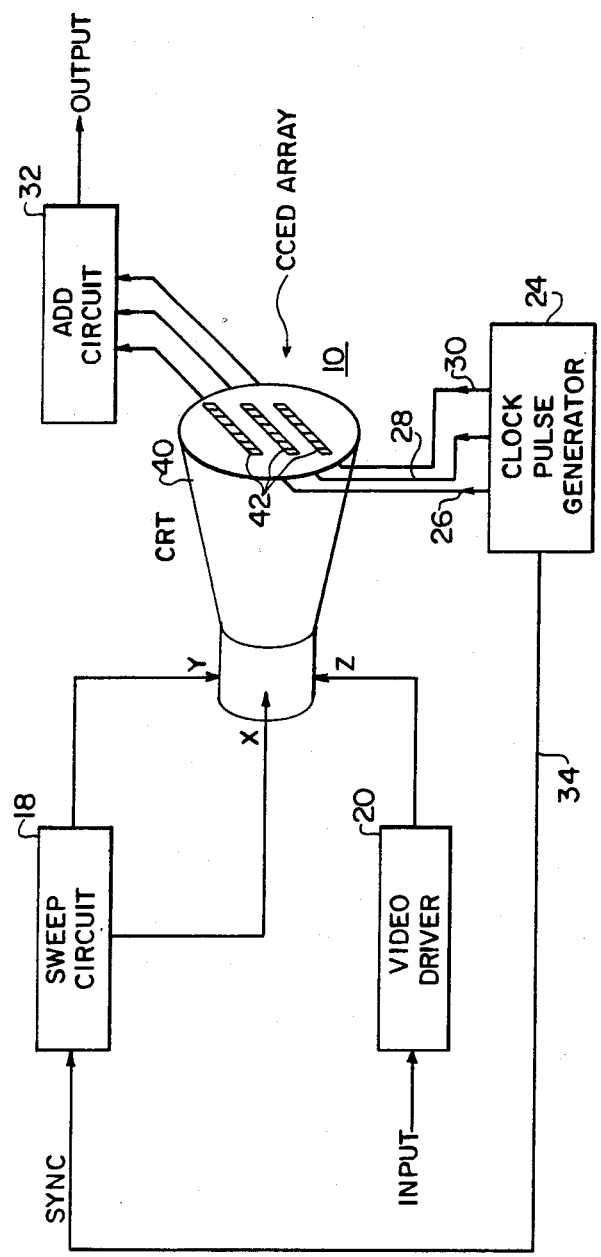
FIG. 2 is a detailed block diagram of a second embodiment of the present invention.

FIG. 2 represents a second embodiment of the present invention. In this embodiment, the charge coupled devices utilized in the linear arrays have thinned backs and are mounted inside a CRT 40 in place of phosphor. These thinned back charge coupled devices may be arranged in linear arrays 42 and are disposed on the face of the CRT 40 such that the electron beam generated therein will strike the thin backs of the devices. Charge coupled devices in this form are called charge coupled electron devices (CCED's). Such devices may be formed quite simply by machining off the photo detector portion of charge coupled photon detectors. By way of example, the CCPD manufactured by Reticon may be machined in order to obtain such CCED's.

In this embodiment, with the CCED's disposed inside the CRT 40, the charge placed on each element of the array of CCED's comes directly from the electron beam and is proportional to the beam current which is, in turn, proportional to the beam signal amplitude at the time the beam struck the particular array element. As in FIG. 1, the electron beam generated in the CRT 40 is swept across the face of the CRT by the control signals from a sweep circuit 18. The electron current of the electron beam generated in the CRT 40 is again controlled in accordance with the signal from a video driver 20 applied to the Z control input of the CRT. Signal read-out from the linear CCED arrays 42 may be identical with that used in FIG. 1. More specifically, a clock pulse generator 24 may be provided to generate clocking signals on lines 26, 28 and 30 to step out the charges in the linear arrays of CCED's into a signal processor 32. The signal processor 32 may again be comprised of an adder circuit. As in FIG. 1, the clock pulse generator 24 of FIG. 2, also generates a sync pulse on line 34 for application to the sweep circuit 18 in order to synchronize the CRT sweeping with the beginning of the radar range sweep.

Basically, the read-in bandwidth (B) of this invention is determined by the dwell time (T) of the beam on an individual charge coupled element. T is controlled by the beam sweep rate R, the array element width $W_e$, and the electron beam width $W_b$ according to the equation:

$$T = (W_e + W_b)/R$$

The bandwidth is then defined as $$B = 1/2T$$

in order to permit sampling at the Nyquist rate.

The charge place on each charge coupled device will be proportional to the product of IT, i.e.

$$Q = kIT$$

where k is the constant of proportionality, and I is electron current from the CRT. By way of example, if it is desired to place $10^3$ electrons on an element in one nanosecond, i.e. $10^{-9}$ seconds, (500 MHz bandwidth) with $k = 10^{-2}$, then the current I must be:

$$I = Q/kT = \frac{10^{+3}}{10^{-2} \times 10^{-9}} = 10^{14} \text{ electrons/sec.}$$

Since 1 electron per second is $1.6 \times 10^{-19}$ amperes, the $10^{14}$ electrons corresponds to:

$$I = 1.6 \times 10^{-19} \times 10^{14} = 1.6 \times 10^{-5} \text{ amps}$$

which is well within the state of the art. It is generally desirable to provide an electron beam current which will yield a reasonable dynamic range of 30–40 dB.

The number of resolution cells that can be obtained will generally be determined by the size of the CRT face and the size of the electron beam when the embodiments of FIG. 1 or FIG. 2 are utilized. Conventional tubes provide on the order $500 \times 500$ line resolution or $2.5 \times 10^5$ resolution cells. This would be adequate to store one range sweep of a radar with a 100 mile range ($\approx 200{,}000$ meters) with a pulse length of 6 nanoseconds.

It should be noted that the present invention is not restricted to the use of modulated electron beams. Any type of modulated energy beam could be utilized to implement the high speed read-in technique of the present invention. For example, a modulated scanning laser beam could be utilized for high speed read-in of data.

It should also be noted that modulation of beam deflection in accordance with the input signal could be utilized in place of electron current modulation to read charge into the charge coupled device arrays. This modulation could be accomplished by controlling the percentage of the beam that strikes each element.

FIG. 3 discloses a block diagram of a pulse generator which may be utilized for the clock pulse generators 24 of FIGS. 1 and 2. The clock pulse generator disclosed in FIG. 3 demonstrates one possible form which this pulse generator may take. It is of course understood that there are a wide variety of clock generating sequences which may be utilized for stepping out the charges stored in the linear arrays of charge coupled devices and the present invention is clearly not limited to the clock pulse generating circuitry of FIG. 3.

Referring now to the figure, the circuit disclosed therein is designed to provide a series of pulses to each linear array of charge coupled devices to step-out the charges in those arrays into processing circuit 32. A typical method of stepping the charges through a given linear arrays of charge coupled devices is to provide a pulse to energize the first charge coupled device and all of the odd-numbered charge coupled devices in that linear array such that they may store charge in their respective capacitors. Then, a second pulse is applied to the gates of all of the even-numbered charge coupled devices to cause the stepping of the charge from the odd numbered charge coupled devices to the capacitors of the even numbered charge coupled devices. This interlaced pulse sequence allows the sequential stepping of the charge from the first charge coupled device all the way to the last charge coupled device in the array. If there are N charge coupled devices in each of the linear arrays, it can be seen that 2 N pulses will be required to step the charge through the entire linear array length of charge coupled devices and into the processing circuit 32. Accordingly, the circuit of FIG. 3 is designed to apply 2 N pulses on line 26 to step-out the charges in the top linear array of charge coupled devices, then to apply 2 N pulses to the middle linear array of charge coupled devices, and finally to apply 2 N pulses to the bottom linear array of charge coupled devices, to thereby read-in the contents of the entire array 10 of charge coupled devices serially into the processor 32. This stepping-out scheme is implemented by utilizing a clock pulse generator, series 2 N counters, AND gates, flipflops, and gate pulse generators. In order to apply the sets of 2 N pulses to step the linear arrays 12, the pulses from a clock pulse generator 50 are applied to one input of the AND gates 54, 70, and 82 and to the 2 N counters 52, 64, and 76. The stepping-out sequence is begun by the application on line 48 of a radar trigger synchronization signal from the radar transmitter to the 2 N counter 52 and to gate pulse generator 56. This radar trigger pulse causes the 2 N counter 52 to begin counting to 2 N. The radar trigger also energizes the gate pulse generator 56 to apply an enable pulse on line 58 to the second input of the AND gate 54. AND gate 54 is thus enabled and passes the clock pulses from the clock pulse generator 50 through a flipflop 60. The 1 outputs from the flipflop 60 may be applied, by way of example, to the gates of all of the odd charge coupled devices in the top linear array via line 26 (1). Likewise, the 0 output of the flipflop 60 may be applied thru an inverter 61 to energize the gates of all of the even charge coupled devices in the top array via line 26 (2). When the counter 52 counts to 2 N, then it will generate a pulse on line 62 which will act to turn off the gate pulse generator 56 to thereby disable the AND gate 54. This pulse on line 62 is also applied to turn on 2 N counter 64 and the gate pulse generator 66. The counter 64 begins counting the pulses from the clock pulse generator 50 on line 51 and the gate pulse generator 66 applies an enable pulse to AND gate 70. This enable pulse to AND gate 70 allows that gate to pass the clock pulses on line 51 through the flipflop 72. The 1 outputs from the flipflop 72 may again be applied to the gates of the odd charge coupled devices in the middle linear array via line 28 (1). Likewise, the 0 outputs from the flipflop 72, after inversion via inverter 74, may be applied to the gates of the even charge coupled devices in the middle linear array via line 28 (2). When the counter 64 reaches the count of 2 N, it generates a pulse on line 80 to turn off the gate pulse generator 66 to thereby disable and AND gate 70, and to turn on the 2 N counter 76 and the gate pulse generator 78. Upon energization, the gate pulse generator 78 applies an enable pulse to the second input of the AND gate 82. This enable pulse allows the AND gate 82 to pass the clock pulses through the flipflop 84. Again, the 1 outputs from the flipflop 84 may be applied to the gates of the odd charge coupled devices in the bottom linear array via the line 30 (1). Likewise, the 0 outputs from the flipflop 84, after inversion by the inverter 85, may be applied to the gates of the even charge coupled devices in the bottom linear array via the line 30 (2). When the counter 76 reaches the count of 2 N, it generates a pulse on the line 86 to turn off gate pulse generator 78. The system of FIG. 3 then is ready to receive the next radar trigger signal via the line 48.

The present invention permits fast real-time read-in. Thus, it may be used to record in real-time echos from high resolution radars using short pulses while still permitting the use of conventional bandwidth processors later in the system. This invention is also advantageous in that it significantly increases the range cell resolution of the delay line by changing from a single linear array of charge coupled device range cells to a plurality of linear arrays of range cells arranged in spatial parallel such that a single energy beam may be utilized to read-in the data for all of the charge coupled devices in the entire series of linear arrays. In essence, the present design arranges a long linear array of charge coupled devices into an area composed of a plurality of much shorter linear arrays which may be read-into utilizing a single energy beam.

The present invention utilizes the fact that the necessity to store ranging data quickly does not necessarily require fast processing of that data. Accordingly, the present invention provides a fast read-in of data to allow its use with wideband systems while minimizing the modifications required for later processing circuits in the system.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States:

1. A wide-band clock-controlled delay line having a high speed read-in and low speed read-out characteristic comprising:
    an array of charge coupled devices;
    energy scanning means for scanning said array of charge coupled devices with a beam of energy capable of modulating the charge in each charge coupled device in said array in accordance with the energy intensity of said beam during the dwell time of said beam on said charge coupled device, said scanning means having a scanning rate sufficient to operate on short pulses from a wide band system;
    means for applying an input signal to said energy scanning means to control the intensity of said energy beam in accordance therewith;
    signal processing means; and
    clock pulse generator means coupled to said array of charge coupled devices for generating clock pulses for stepping out the charges stored in said array of charge coupled devices into said signal processing means.

2. A delay line as defined in claim 1, wherein said array of charge coupled devices comprises a series of closely spaced parallel linear arrays of charge coupled devices.

3. A delay line as defined in claim 2, wherein the charge coupled devices in said linear arrays are charge coupled photon detectors; and
    wherein said energy scanning means comprises:
        a short persistence phosphor face;
        means for generating and scanning an electron beam across said short persistence phosphor face to thereby excite said phosphor to emit radiation with an intensity proportional to the electron current in said scanning electron beam; and
        means for collecting and focusing the light emissions from said phosphors on to said series of linear arrays of charge coupled photon detectors.

4. A delay line as defined in claim 3, wherein said signal processing means comprises an adding circuit for adding linear groups of charges from said series of linear arrays.

5. A delay line as defined in claim 2, wherein said energy scanning means comprises a cathode ray tube for generating an electron beam and means for sweeping said beam; and
    wherein the charge coupled devices in said array are charge coupled electron devices (CCED's), said array of CCED's being mounted inside said cathode ray tube in place of the normal phosphor therein and disposed therein such that charges may be placed directly in said CCED's in said array by the scanning electron beam generated in said cathode ray tube.

6. A delay line as defined in claim 5, wherein said signal processing means comprises an adding circuit for adding linear groups of charges from said series of linear arrays.

7. A method for processing wide band data in order to obtain a high speed read-in and a low speed read-out characteristic comprising the steps of:
    generating and scanning an energy beam across an array of charge coupled devices in order to modulate the charge in each charge coupled device in said array in accordance with the energy intensity of said beam;
    modulating the intensity of said scanning energy beam in accordance with an input signal; and
    stepping out the charges stored in said charge coupled devices into a signal processing circuit in accordance with a set of clock pulses.

* * * * *